(12) United States Patent
Jiang et al.

(10) Patent No.: US 11,606,282 B2
(45) Date of Patent: Mar. 14, 2023

(54) METHOD AND DEVICE FOR DETECTING NETWORK RELIABILITY

(71) Applicant: Huawei Technologies Co., Ltd., Guangdong (CN)

(72) Inventors: Xiaobin Jiang, Shanghai (CN); Xiaojun Liu, Shenzhen (CN); Xiaoqian Jia, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/334,583

(22) Filed: May 28, 2021

(65) Prior Publication Data

US 2021/0288899 A1 Sep. 16, 2021

Related U.S. Application Data

(63) Continuation of application No. PCT/CN2019/121076, filed on Nov. 26, 2019.

(30) Foreign Application Priority Data

Nov. 30, 2018 (CN) .......................... 201811464642.1

(51) Int. Cl.
*H04L 43/50* (2022.01)
*H04L 43/0811* (2022.01)
(Continued)

(52) U.S. Cl.
CPC .......... *H04L 43/50* (2013.01); *H04L 43/0811* (2013.01); *H04L 43/0817* (2013.01); *H04L 43/0852* (2013.01)

(58) Field of Classification Search
CPC . H04L 43/50; H04L 43/0811; H04L 43/0817; H04L 43/0852
See application file for complete search history.

(56) References Cited

U.S. PATENT DOCUMENTS

| 7,953,020 B2* | 5/2011 | Breslau | H04L 43/026 |
| | | | 370/252 |
| 8,223,655 B2* | 7/2012 | Heinz | H04L 43/06 |
| | | | 370/241 |

(Continued)

FOREIGN PATENT DOCUMENTS

| CN | 102201947 A | 9/2011 |
| CN | 202167018 U | 3/2012 |

(Continued)

OTHER PUBLICATIONS

Huawei, Siemens, cyberCAV 22.104 Annex: Communication service availability vs PER . 3GPP TSG SA WG1 Meeting #83, West Palm Beach, Aug. 20-24, 2018, S1-182213, 6 pages.

(Continued)

*Primary Examiner* — Jerry B Dennison
(74) *Attorney, Agent, or Firm* — Womble Bond Dickinson (US) LLP

(57) ABSTRACT

Embodiments of this application disclose a method and a device for detecting network reliability. The method includes: A detection apparatus obtains a first quantity of data packets included in a first packet sent by a first network node to a second network node. The detection apparatus obtains first feedback information sent by the second network node, where the first feedback information includes a second quantity of data packets included in the first packet received by the second network node. The detection apparatus calculates communication service availability of a network channel from the first network node to the second network node based on at least one of the first quantity or the second quantity. Embodiments of this application can quickly and accurately detect and evaluate the network reliability.

18 Claims, 4 Drawing Sheets

(51) Int. Cl.
*H04L 43/0817* (2022.01)
*H04L 43/0852* (2022.01)

(56) References Cited

U.S. PATENT DOCUMENTS

| | | | | |
|---|---|---|---|---|
| 8,937,870 | B1* | 1/2015 | Callaghan | H04L 43/50 370/248 |
| 10,263,869 | B1* | 4/2019 | Dzierwinski | H04L 43/50 |
| 10,827,413 | B2* | 11/2020 | Railkar | H04L 45/123 |
| 10,880,046 | B2* | 12/2020 | Kashiwazaki | G06F 13/00 |
| 11,153,887 | B2* | 10/2021 | Krishnan | H04W 72/085 |
| 2007/0115847 | A1* | 5/2007 | Strutt | H04L 43/00 370/252 |
| 2013/0103821 | A1* | 4/2013 | Gonia | H04W 24/06 709/224 |
| 2013/0308471 | A1* | 11/2013 | Krzanowski | H04L 43/0811 370/252 |
| 2014/0105058 | A1* | 4/2014 | Hu | H04W 24/08 370/253 |
| 2015/0208316 | A1* | 7/2015 | Mosko | H04L 45/02 370/238 |
| 2016/0191402 | A1* | 6/2016 | Anderson | H04L 47/25 370/236 |
| 2016/0269260 | A1* | 9/2016 | Kazmi | H04L 1/20 |
| 2017/0019463 | A1* | 1/2017 | Tsunoda | H04L 67/14 |
| 2017/0366983 | A1* | 12/2017 | Gunasekara | H04W 24/08 |
| 2018/0048581 | A1* | 2/2018 | Suga | H04L 47/27 |
| 2018/0206110 | A1* | 7/2018 | Chaki | H04W 40/32 |
| 2018/0302313 | A1* | 10/2018 | Blanchard | H04L 43/0847 |
| 2019/0253195 | A1* | 8/2019 | Kashiwazaki | H04L 67/01 |
| 2020/0008085 | A1* | 1/2020 | Chakraborty | H04W 52/00 |
| 2020/0336932 | A1* | 10/2020 | Jiang | H04L 43/0823 |
| 2021/0288899 | A1* | 9/2021 | Jiang | H04L 43/0811 |
| 2021/0289518 | A1* | 9/2021 | Huang | G01C 21/3691 |

FOREIGN PATENT DOCUMENTS

| | | |
|---|---|---|
| CN | 102195341 B | 4/2013 |
| CN | 103369416 A | 10/2013 |
| CN | 103491636 A | 1/2014 |
| CN | 104022999 A | 9/2014 |
| CN | 104967635 A | 10/2015 |
| CN | 105071961 A | 11/2015 |
| CN | 105323121 A | 2/2016 |
| CN | 105488739 A | 4/2016 |
| CN | 105515915 A | 4/2016 |
| CN | 105634840 A | 6/2016 |
| CN | 105704771 A | 6/2016 |
| CN | 105847611 A | 8/2016 |
| CN | 105897613 A | 8/2016 |
| CN | 102238651 B | 9/2016 |
| CN | 102790699 B | 9/2016 |
| CN | 103561427 B | 11/2016 |
| CN | 106100771 A | 11/2016 |
| CN | 106302226 A | 1/2017 |
| CN | 106487605 A | 3/2017 |
| CN | 106658644 A | 5/2017 |
| CN | 107454000 A | 12/2017 |
| CN | 107579869 A | 1/2018 |
| CN | 108513703 A | 9/2018 |
| EP | 3188413 A1 | 7/2017 |
| WO | 2008106768 A1 | 9/2008 |
| WO | 2017015965 A1 | 2/2017 |
| WO | 2017162115 A1 | 9/2017 |

OTHER PUBLICATIONS

Siemens AG and Nokia, Smarter Comparison of two concepts: communication service availability and reliability. 3GPP TSG-SA WG1 Meeting #77, Jeju Island, South Korea, Feb. 13-17, 2017, S1-171196, 6 pages.

Huawei et al.: "cyberCAV—22.104—network performance: Communication service availability", 3GPP Draft; S1-183134-22, Nov. 12-16, 2018, XP051563019, total 5 pages.

Siemens AG and Nokia: "Smarter Comparison of two concepts: communication service availability and reliability",3GPP Draft; S1-171196, Feb. 20, 2017, XP051240220, total 6 pages.

* cited by examiner

METHOD AND DEVICE FOR DETECTING NETWORK RELIABILITY

CROSS-REFERENCE TO RELATED APPLICATIONS

This application is a continuation of International Application No. PCT/CN2019/121076, filed on Nov. 26, 2019, which claims priority to Chinese Patent Application No. 201811464642.1, filed on Nov. 30, 2018, The disclosures of the aforementioned applications are hereby incorporated by reference in their entireties.

TECHNICAL FIELD

This application relates to the field of computer technologies, and in particular, to a method and a device for detecting network reliability.

BACKGROUND

A network of computing devices may be used to transmit data. With the continuous development of network-based data transmission technologies, people have increasingly higher requirements on network reliability. Currently, detection of network reliability is implemented inside a network mainly by using a packet Internet groper (packet Internet groper, PING) to check whether the network is connected, and help a user analyze and determine the network reliability. However, the packet Internet groper needs to be offline and is manually used to perform measurement, and can only detect reliability of a network channel between a device of the packet Internet groper and another network device, but cannot detect reliability of an entire network including a plurality of network devices. How to quickly and accurately detect and evaluate the network reliability is a problem that urgently needs to be resolved by a person skilled in the art.

SUMMARY

Embodiments of this application provide a method and a device for detecting network reliability, to quickly and accurately detect and evaluate network reliability.

In some embodiments (sometimes referred to as, "a first aspect"), the present application provides a method for detecting network reliability. The method includes: A detection apparatus obtains a first quantity of data packets included in a first packet sent by a first network node to a second network node. The detection apparatus obtains first feedback information sent by the second network node, where the first feedback information includes a second quantity of data packets included in the first packet received by the second network node. The detection apparatus calculates communication service availability CSA of a network channel from the first network node to the second network node based on the first quantity and/or the second quantity.

In the foregoing method, the detection apparatus may obtain the first quantity of data packets included in the first packet sent by the first network node to the second network node, and/or the second quantity of data packets included in the first packet received by the second network node; and/or obtain the communication service availability CSA of the network channel from the first network node to the second network node through calculation based on the first quantity and/or the second quantity. In some embodiments, the communication service availability may be used as an indicator to evaluate the network reliability. In some embodiments, there is no need to manually detect a network channel between a single device and/or another network device in sequence, and reliability between network nodes in a network can be quickly and accurately detected and/or evaluated.

With reference to the first aspect, in some embodiments, that a detection apparatus obtains a first quantity of data packets included in a first packet sent by a first network node to a second network node includes: The detection apparatus sends the first packet to the first network node. The detection apparatus receives second feedback information sent by the first network node, where the second feedback information includes the first quantity of data packets included in the first packet.

With reference to the first aspect, in some embodiments, that a detection apparatus obtains a first quantity of data packets included in a first packet sent by a first network node to a second network node includes: The detection apparatus determines the first quantity. The detection apparatus sends indication information to the first network node, where the indication information is used to indicate the first network node to send the first packet to the second network node, and/or the first packet includes the data packets of the first quantity.

With reference to the first aspect, in some embodiments, that a detection apparatus obtains a first quantity of data packets included in a first packet sent by a first network node to a second network node includes: The detection apparatus sends indication information to the first network node, where the indication information is used to indicate the first network node to send the first packet. The detection apparatus receives second feedback information sent by the first network node, where the second feedback information includes the first quantity of data packets included in the first packet.

With reference to the first aspect, in some embodiments, the first packet is a special packet sent by the first network node to the second network node. That a detection apparatus obtains a first quantity of data packets included in a first packet sent by a first network node to a second network node includes: The detection apparatus receives second feedback information sent by the first network node, where the second feedback information includes the first quantity of data packets included in the first packet.

With reference to the first aspect, in some embodiments, that the detection apparatus calculates communication service availability CSA of a network channel from the first network node to the second network node based on the first quantity and/or the second quantity includes: The detection apparatus calculates a ratio of the second quantity to the first quantity; and/or determines the ratio as the communication service availability of the network channel from the first network node to the second network node.

With reference to the first aspect, in some embodiments, the detection apparatus determines, based on the communication service availability CSA of the network channel from the first network node to the second network node, whether a fault occurs on the network channel from the first network node to the second network node.

With reference to the first aspect, in some embodiments, there are a plurality of network channels from the first network node to the second network node, and/or the method includes: The detection apparatus determines CSA of each of the plurality of network channels from the first network node to the second network node. The detection apparatus selects a target network channel from the plurality of network channels based on the CSA of each network channel, where the target network channel is used to transmit data from the first network node to the second network node.

In some embodiments (sometimes referred to as, "a second aspect"), the present application provides another method for detecting network reliability, applied to a network element, where the network element includes at least one of a detection module, a first module, and a second module. The method includes: The detection module obtains a first quantity of data packets included in a first packet sent by the first module to the second module. The detection module obtains first feedback information sent by the second module, where the first feedback information includes a second quantity of data packets included in the first packet received by the second module. The detection module calculates communication service availability CSA of a network channel from the first module to the second module based on the first quantity and/or the second quantity.

In the foregoing method, the detection module may obtain the first quantity of data packets included in the first packet sent by the first module to the second module, and/or the second quantity of data packets included in the first packet received by the second module; and/or obtain the communication service availability CSA of the network channel from the first module to the second module through calculation based on the first quantity and/or the second quantity. In some embodiments, the communication service availability may be used as an indicator to evaluate the network reliability. In some embodiments, there is no need to manually detect a network channel between a single device and/or another network device in sequence, and reliability between modules in a network can be quickly and accurately detected and/or evaluated.

With reference to the second aspect, in some embodiments, that the detection module obtains a first quantity of data packets included in a first packet sent by the first module to the second module includes: The detection module sends the first packet to the first module. The detection module receives second feedback information sent by the first module, where the second feedback information includes the first quantity of data packets included in the first packet.

With reference to the second aspect, in some embodiments, that the detection module obtains a first quantity of data packets included in a first packet sent by the first module to the second module includes: The detection module determines the first quantity. The detection module sends indication information to the first module, where the indication information is used to indicate the first module to send the first packet to the second module, and/or the first packet includes the data packets of the first quantity.

With reference to the second aspect, in some embodiments, that the detection module obtains a first quantity of data packets included in a first packet sent by the first module to the second module includes: The detection module sends indication information to the first module, where the indication information is used to indicate the first module to send the first packet. The detection module receives second feedback information sent by the first module, where the second feedback information includes the first quantity of data packets included in the first packet.

With reference to the second aspect, in some embodiments, the first packet is a special packet sent by the first module to the second module. That the detection module obtains a first quantity of data packets included in a first packet sent by the first module to the second module includes: The detection module receives second feedback information sent by the first module, where the second feedback information includes the first quantity of data packets included in the first packet.

With reference to the second aspect, in some embodiments, that the detection module calculates communication service availability CSA of a network channel from the first module to the second module based on the first quantity and/or the second quantity includes: The detection module calculates a ratio of the second quantity to the first quantity; and/or determines the ratio as the communication service availability of the network channel from the first module to the second module.

With reference to the second aspect, in some embodiments, the detection module determines, based on the communication service availability CSA of the network channel from the first module to the second module, whether a fault occurs on the network channel from the first module to the second module.

With reference to the second aspect, in some embodiments, the detection module determines CSA of each of a plurality of network channels from the first module to the second module. The detection module selects a target network channel from the plurality of network channels based on the CSA of each network channel, where the target network channel is used to transmit data from the first module to the second module.

In some embodiments (sometimes referred to as, "a third aspect"), the present application provides a detection apparatus. The apparatus includes a first obtaining unit, a second obtaining unit, and/or a calculation unit. The first obtaining unit is configured to obtain a first quantity of data packets included in a first packet sent by a first network node to a second network node. The second obtaining unit is configured to obtain first feedback information sent by the second network node, where the first feedback information includes a second quantity of data packets included in the first packet received by the second network node. The calculation unit is configured to calculate communication service availability CSA of a network channel from the first network node to the second network node based on the first quantity and/or the second quantity.

With reference to the third aspect, in some embodiments, the first obtaining unit is configured to: send the first packet to the first network node; and/or receive second feedback information sent by the first network node, where the second feedback information includes the first quantity of data packets included in the first packet.

With reference to the third aspect, in some embodiments, the first obtaining unit is configured to: determine the first quantity; and/or send indication information to the first network node, where the indication information is used to indicate the first network node to send the first packet to the second network node, and/or the first packet includes the data packets of the first quantity.

With reference to the third aspect, in some embodiments, the first obtaining unit is configured to: send indication information to the first network node, where the indication information is used to indicate the first network node to send the first packet; and/or receive second feedback information sent by the first network node, where the second feedback information includes the first quantity of data packets included in the first packet.

With reference to the third aspect, in some embodiments, the first packet is a special packet sent by the first network node to the second network node. The first obtaining unit is configured to receive second feedback information sent by the first network node, where the second feedback information includes the first quantity of data packets included in the first packet.

With reference to the first aspect, in some embodiments, the calculation unit is configured to: calculate a ratio of the second quantity to the first quantity; and/or determine the ratio as the communication service availability of the network channel from the first network node to the second network node.

With reference to the third aspect, in some embodiments, the apparatus includes a determining unit. The determining unit is configured to determine, based on the communication service availability CSA of the network channel from the first network node to the second network node, whether a fault occurs on the network channel from the first network node to the second network node.

With reference to the third aspect, in some embodiments, there are a plurality of network channels from the first network node to the second network node, and/or the apparatus includes a selection unit. The selection unit is configured to: determine CSA of each of the plurality of network channels from the first network node to the second network node; and/or select a target network channel from the plurality of network channels based on the CSA of each network channel, where the target network channel is used to transmit data from the first network node to the second network node.

In some embodiments (sometimes referred to as, "a fourth aspect"), the present application provides a network element, where the network element includes at least a detection module, a first module, and/or a second module. The detection module includes a first obtaining submodule, a second obtaining submodule, and/or a calculation submodule. The first obtaining submodule is configured to obtain a first quantity of data packets included in a first packet sent by the first module to the second module. The second obtaining submodule is configured to obtain first feedback information sent by the second module, where the first feedback information includes a second quantity of data packets included in the first packet received by the second module. The calculation submodule is configured to calculate communication service availability CSA of a network channel from the first module to the second module based on the first quantity and/or the second quantity.

With reference to the fourth aspect, in some embodiments, the first obtaining submodule is configured to: send the first packet to the first module; and/or receive second feedback information sent by the first module, where the second feedback information includes the first quantity of data packets included in the first packet.

With reference to the fourth aspect, in some embodiments, the first obtaining submodule is configured to: determine the first quantity; and/or send indication information to the first module, where the indication information is used to indicate the first module to send the first packet to the second module, and/or the first packet includes the data packets of the first quantity.

With reference to the fourth aspect, in some embodiments, the first obtaining subunit is configured to: send indication information to the first module, where the indication information is used to indicate the first module to send the first packet; and/or receive second feedback information sent by the first module, where the second feedback information includes the first quantity of data packets included in the first packet.

With reference to the fourth aspect, in some embodiments, the first packet is a special packet sent by the first module to the second module. The first obtaining subunit is configured to receive second feedback information sent by the first module, where the second feedback information includes the first quantity of data packets included in the first packet.

With reference to the fourth aspect, in some embodiments, the calculation submodule is configured to: calculate a ratio of the second quantity to the first quantity; and/or determine the ratio as the communication service availability of the network channel from the first module to the second module.

With reference to the fourth aspect, in some embodiments, the network element includes a determining module: The determining module is configured to determine, based on the communication service availability CSA of the network channel from the first module to the second module, whether a fault occurs on the network channel from the first module to the second module.

With reference to the fourth aspect, in some embodiments, there are a plurality of network channels from the first module to the second module, and/or the network element includes a selection module. The selection module is configured to: determine CSA of each of the plurality of network channels from the first module to the second module; and/or select a target network channel from the plurality of network channels based on the CSA of each network channel, where the target network channel is used to transmit data from the first module to the second module.

In some embodiments (sometimes referred to as, "a fifth aspect"), the present application provides another detection apparatus, including a processor and a memory, where the processor and the memory are interconnected. The memory is configured to store program instructions, and/or the processor is configured to invoke the program instructions in the memory to perform (e.g., execute, implement) the method described in any one of the first aspect or the possible implementations of the first aspect.

In some embodiments (sometimes referred to as, "a sixth aspect"), the present application provides another network element, including a processor and a memory, where the processor and the memory are interconnected. The memory is configured to store program instructions, and/or the processor is configured to invoke the program instructions in the memory to perform the method described in any one of the second aspect or the possible implementations of the second aspect.

In some embodiments (sometimes referred to as, "a seventh aspect"), the present application provides a computer-readable storage medium. The computer storage medium stores program instructions, and when the program instructions are run by a processor, the processor performs the method described in any one of the first aspect or the possible implementations of the first aspect.

In some embodiments (sometimes referred to as, "an eighth aspect"), the present application provides another computer-readable storage medium. The computer storage medium stores program instructions, and when the program instructions are run by a processor, the processor performs the method described in any one of the second aspect or the possible implementations of the second aspect.

In some embodiments (sometimes referred to as, "a ninth aspect"), the present application provides a computer program, and when the computer program is run on a processor, the processor performs the method described in any one of the first aspect or the possible implementations of the first aspect.

In some embodiments (sometimes referred to as, "a tenth aspect"), the present application provides a computer program, and when the computer program is run on a processor, the processor performs the method described in any one of the second aspect or the possible implementations of the second aspect.

In the embodiments of this application, the detection apparatus may obtain the first quantity of data packets included in the first packet sent by the first network node to the second network node, and/or the second quantity of data packets included in the first packet received by the second network node; and/or obtain the communication service availability CSA of the network channel from the first network node to the second network node through calculation based on the first quantity and/or the second quantity. In some embodiments, the communication service availability may be used as the indicator to evaluate the network reliability. In some embodiments, there is no need to manually detect the network channel between the single device and/or the another network device in sequence, and the reliability between the network nodes in the network can be quickly and accurately detected and evaluated.

BRIEF DESCRIPTION OF DRAWINGS

To describe the technical solutions in embodiments of this application or in the conventional technology more clearly, the following briefly describes the accompanying drawings for describing the embodiments or the conventional technology.

DESCRIPTION OF EMBODIMENTS

The following describes the technical solutions in embodiments of this application in more detail.

Figure 1:
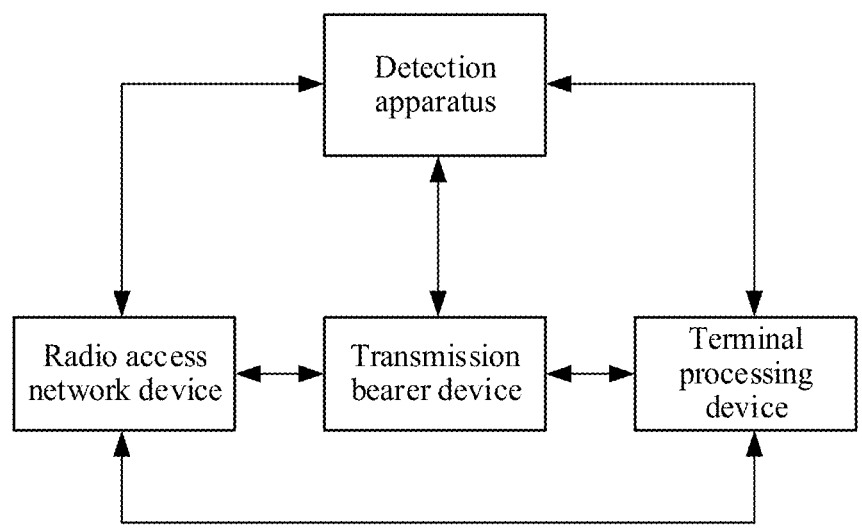
FIG. 1 is a schematic architectural diagram of an example system for detecting network reliability according to an embodiment of this application.

FIG. 1 is a schematic architectural diagram of an example system for detecting network reliability according to an embodiment of this application. The system includes a detection apparatus and a plurality of network nodes. The detection apparatus communicates with the plurality of network nodes by using a network. The following describes the detection apparatus and the plurality of network nodes.

The detection apparatus is an apparatus for detecting the network reliability in the solutions, and may send (e.g., transmits, provides, delivers) a packet to the plurality of network nodes, and calculate the network reliability by obtaining messages fed back by the plurality of network nodes based on the packet; or calculate the network reliability by obtaining information in a special packet in the network and/or feedback information of the special packet.

The plurality of network nodes are devices that jointly form the network. The plurality of network nodes may communicate with the detection apparatus, and/or the plurality of network nodes may communicate with each other. The plurality of network nodes each may include a detection submodule. After receiving (e.g., retrieving, obtaining, acquiring) a first packet in the solutions, the detection submodule sends feedback information to the detection apparatus. The feedback information includes a quantity of data packets included in the first packet received by the network node. The plurality of network nodes may be network devices of different types. For example, the plurality of network nodes in FIG. 1 are radio access network RAN (radio access network) devices, transmission bearer devices, and terminal processing devices.

Figure 2:
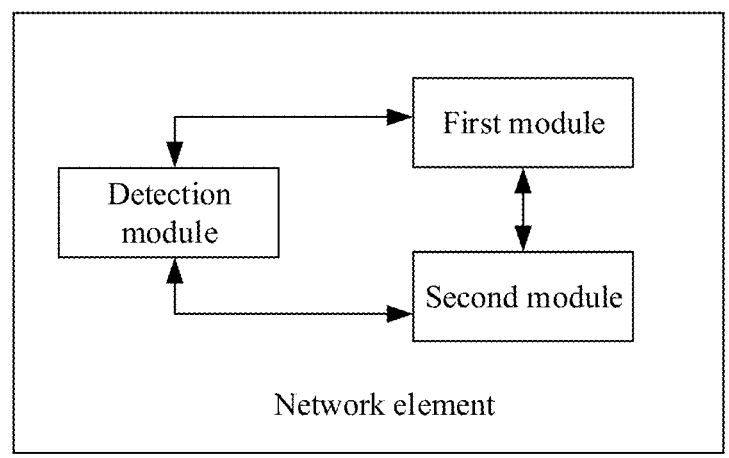
FIG. 2 is a schematic architectural diagram of an example system for detecting network reliability according to an embodiment of this application.

FIG. 2 is a schematic architectural diagram of an example system for detecting network reliability according to an embodiment of this application. The system is a network element. The network element includes a detection module and at least two modules other than the detection module. The figure shows a first module and a second module. The following describes the foregoing modules.

The detection module may send a packet to the first module and/or the second module, and/or calculate the network reliability by obtaining messages fed back by the two modules based on the packet; or calculate the network reliability by obtaining information in a special packet in a network and/or feedback information of the special packet.

The first module and second module are modules that jointly form the network element, and the two modules may communicate with each other. The two modules may be modules of different types. The first module and the second module each may include a detection submodule. After receiving a first packet in the solutions, the detection submodule sends feedback information to the detection module. The feedback information includes a quantity of data packets included in the first packet received by the module.

Figure 3:
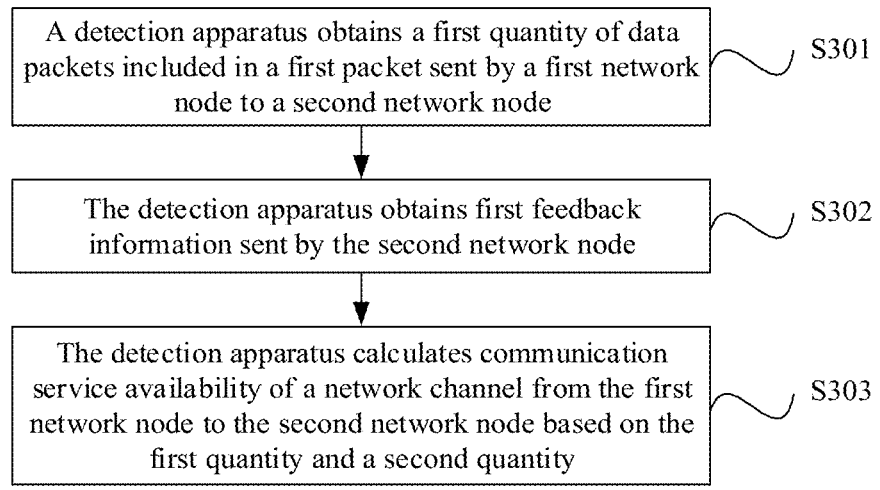
FIG. 3 is a flowchart of an example method for detecting network reliability according to an embodiment of this application.

FIG. 3 is a flowchart of an example method for detecting network reliability according to an embodiment of this application. The method may be implemented based on the architecture shown in FIG. 1. An apparatus described below may be the detection apparatus in the system architecture shown in FIG. 1. The method includes but is not limited to the following operations.

S301: The detection apparatus obtains a first quantity of data packets included in a first packet sent by a first network node to a second network node.

The first packet includes a plurality of data packets. In some embodiments, the first packet may have two possible cases. The following describes the two possible cases.

In a first manner, the first packet is a test packet generated by the detection apparatus. In some embodiments, each of the plurality of network nodes includes a detection module. When receiving the test packet sent by the detection apparatus, the detection module sends feedback information to the detection apparatus. The feedback message includes a quantity of data packets in the test packet received by the network node. A manner in which the detection apparatus obtains the first quantity of data packets included in the first packet sent by the first network node to the second network node may be: The detection apparatus sends the first packet to the first network node; the detection apparatus receives second feedback information sent by the first network node, where the second feedback information includes the first quantity of data packets included in the first packet.

In a second manner, the first packet is a test packet that the detection apparatus indicates the first network node to generate. After generating (e.g., producing, constructing, creating) the test packet, the first network node sends the first packet to the second network node. A manner in which the detection apparatus obtains the first quantity of data packets included in the first packet sent by the first network node to the second network node may be: The detection apparatus determines (e.g., identifies, assesses) the first quantity; the detection apparatus sends indication information to the first network node, where the indication information is used to indicate the first network node to send the first packet to the second network node, and/or the first packet includes the data packets of the first quantity.

In some embodiments, a manner in which the detection apparatus obtains the first quantity of data packets included in the first packet sent by the first network node to the second network node may be: The detection apparatus sends indication information to the first network node, where the indication information is used to indicate the first network node to send the first packet; the detection apparatus receives second feedback information sent by the first network node, where the second feedback information includes the first quantity of data packets included in the first packet.

In a third manner, the first packet is a special packet. It should be noted that the special packet is a packet that exists in the network and that is used to implement a specific function. After the second network node receives the special packet, the second network node sends feedback information to the first network node. For example, the feedback information may be an access request sent by a terminal to a radio access network. After receiving the access application, the radio access network sends feedback information to the terminal. In some embodiments, the special packet may be generated by the first network node. After generating the special packet, the first network node sends the special packet to the second network node. The special packet may be generated by another network node. After generating the special packet, the another network node sends the special packet to the first network node, and/or the first node sends the special packet to the second network node.

In some embodiments, a manner in which the detection apparatus obtains the first quantity of data packets included in the first packet sent by the first network node to the second network node may be: The detection apparatus receives second feedback information sent by the first network node, where the second feedback information includes the first quantity of data packets included in the first packet, and/or the second feedback information is generated by a detection submodule in the first network node.

S302: The detection apparatus obtains first feedback information sent by the second network node.

The feedback information includes a second quantity of data packets included in the first packet received by the second network node. In some embodiments, a detection submodule in the second network node sends the first feedback information to the detection apparatus, and/or the detection apparatus receives the first feedback information. In some embodiments, the detection apparatus may determine, based on the first feedback information, the second quantity of data packets included in the first packet received by the second network node.

S303: The detection apparatus calculates communication service availability (communication service availability, CSA) of a network channel from the first network node to the second network node based on the first quantity and/or the second quantity.

In some embodiments, a manner in which the detection apparatus calculates the CSA of the network channel from the first network node to the second network node based on the first quantity and/or the second quantity is: calculating a ratio of the second quantity to the first quantity; and/or determining the ratio as the CSA of the network channel from the first network node to the second network node. In a specific implementation process, the CSA of the network channel from the first network node to the second network node may be calculated in a preset time period. In another manner, the CSA of the network channel from the first network node to the second network node is calculated by using a preset time period as a periodicity.

For example, if the second quantity is 36, and the first quantity is 40, the detection apparatus calculates that a quotient of the second quantity 36 and the first quantity 40 is 0.9, and determines 0.9 as the CSA of the network channel from the first network node to the second network node.

In some embodiments, the detection apparatus determines, based on the communication service availability CSA between the first network node and the second network node, whether a fault occurs on the network channel from the first network node to the second network node. In some embodiments, a manner in which the detection apparatus determines, based on the communication service availability CSA between the first network node and the second network node, whether the fault occurs on the network channel from the first network node to the second network node may be: If the CSA of the network channel from the first network node to the second network node is less than a first threshold, the detection apparatus determines that the fault occurs on the network channel from the first network node to the second network node. The first threshold may be preset. For different network channels, the first threshold may have different values. For example, a first threshold of a network channel from a radio access network RAN (radio access network) device to a transmission bearer device may be 0.95, and a first threshold of a network channel from the transmission bearer device to a terminal processing device may be 0.9.

In some embodiments, after the detection apparatus detects that the fault occurs on the network channel from the first network node to the second network node, the detection apparatus may send an alarm. The alarm is used to prompt that the fault occurs on the network channel from the first network node to the second network node.

In a possible case, there may be a plurality of network channels from the first network node to the second network node. The detection apparatus may determine CSA of each of the plurality of network channels from the first network node to the second network node, and/or generate a key performance indicator (key performance indicator, KPI) report based on the CSA of each network channel. A user can directly obtain CSA information of each channel from the KPI report.

In another possible case, there may be a plurality of network channels from the first network node to the second network node. The detection apparatus may determine CSA of each of the plurality of network channels from the first network node to the second network node, and/or select a target network channel from the plurality of network channels based on the CSA of each network channel, where the target network channel is used to transmit data from the first network node to the second network node.

In some embodiments, the following describes methods in which the detection apparatus selects the target network channel from the plurality of network channels based on the CSA of each network channel.

According to a first method, the detection apparatus determines the CSA of each of the plurality of network channels from the first network node to the second network node, and determines a network channel with highest CSA among the plurality of network channels as the target network channel. For example, in a network, optional network channels from the first network node to the second network node are a first network channel and a second network channel. If it is determined that CSA of the first network channel is 0.85, and CSA of the second network channel is 0.9, the detection apparatus determines the second network channel as the target network channel. In some embodiments, the network channel with the highest CSA may be selected for data transmission in the network, thereby improving the network reliability.

According to a second method, the detection apparatus determines a latency of each of the plurality of network channels from the first network node to the second network node, calculates a capability score based on a CSA calculation coefficient, a latency calculation coefficient, the CSA of each network channel, and the latency of each network channel, and determines a network channel with a highest capability score among the plurality of network channels as the target network channel. The CSA calculation coefficient and the latency calculation coefficient may be set by the user.

For example, if in the network, the optional network channels from the first network node to the second network node are the first network channel and the second network channel, the CSA calculation coefficient is 20, and the latency calculation coefficient is −1, it is determined that the CSA of the first network channel is 0.85, and a latency is 5 milliseconds; and the CSA of the second network channel is 0.9, and a latency is 6 milliseconds. A capability score, of the first network channel, calculated based on the CSA calculation coefficient 20, the latency calculation coefficient −1, the CSA 0.85 of the first network channel, and the latency 5 of the first network channel is 12. A capability score, of the first network channel, calculated based on the CSA calculation coefficient 20, the latency calculation coefficient −1, the CSA 0.9 of the first network channel, and the latency 6 of the first network channel is 17. In this case, the detection apparatus determines the second network channel as the target network channel. In some embodiments, a network channel suitable for data transmission may be selected from a plurality of optional network channels by comprehensively considering the CSA and the latency of the network channel.

In the method described in FIG. 3, the detection apparatus may obtain the first quantity of data packets included in the first packet sent by the first network node to the second network node, and the second quantity of data packets included in the first packet received by the second network node; and/or obtain the communication service availability CSA of the network channel from the first network node to the second network node through calculation based on the first quantity and the second quantity. In some embodiments, the communication service availability may be used as an indicator to evaluate the network reliability. In some embodiments, there is no need to manually detect a network channel between a single device and another network device in sequence, and reliability between network nodes in a network can be quickly and accurately detected and evaluated.

Figure 4:
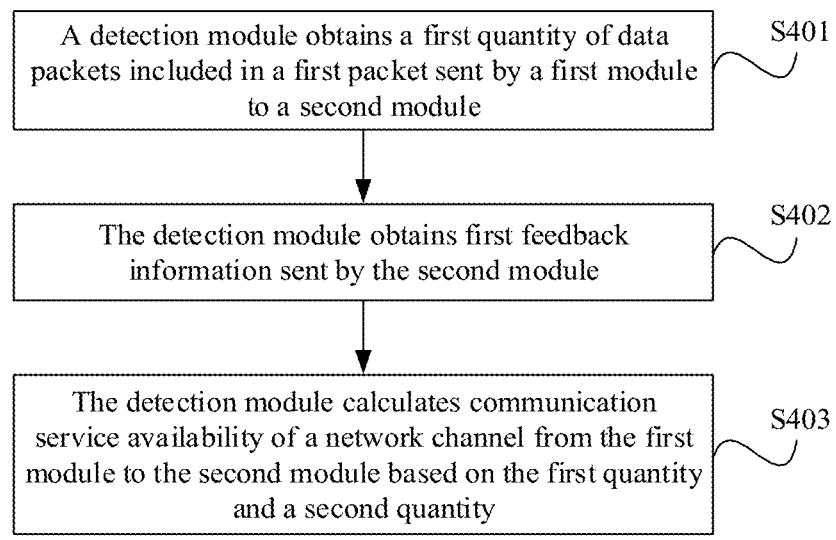
FIG. 4 is a flowchart of an example method for detecting network reliability according to an embodiment of this application.

FIG. 4 shows an example method for detecting network reliability according to an embodiment of this application. The method may be implemented based on the architecture shown in FIG. 2. A network element described below may be the network element in the system architecture shown in FIG. 2. The method includes but is not limited to the following operations.

S401: A detection module obtains a first quantity of data packets included in a first packet sent by a first module to a second module.

The first packet includes a plurality of data packets. In some embodiments, the first packet may have two possible cases. The following describes the two possible cases.

In a first manner, the first packet is a test packet generated by the detection module. In some embodiments, each of the plurality of modules includes a detection submodule. When receiving the test packet sent by the detection module, the detection submodule sends feedback information to the detection module. The feedback message includes a quantity of data packets in the test packet received by the module. A manner in which the detection module obtains the first quantity of data packets included in the first packet sent by the first module to the second module may be: The detection module sends the first packet to the first module; the detection module receives second feedback information sent by the first module, where the second feedback information includes the first quantity of data packets included in the first packet.

In a second manner, the first packet is a test packet that the detection module indicates the first module to generate. After generating the test packet, the first module sends the first packet to the second module. A manner in which the detection module obtains the first quantity of data packets included in the first packet sent by the first module to the second module may be: The detection module determines the first quantity; the detection module sends indication information to the first module, where the indication information is used to indicate the first module to send the first packet to the second module, and the first packet includes the data packets of the first quantity.

In some embodiments, a manner in which the detection module obtains the first quantity of data packets included in the first packet sent by the first module to the second module may be: The detection module sends indication information to the first module, where the indication information is used to indicate the first module to send the first packet. The detection module receives second feedback information sent by the first module, where the second feedback information includes the first quantity of data packets included in the first packet.

In a third manner, the first packet is a special packet. It should be noted that the special packet is a packet that exists in the network element and that is used to implement a specific function. After the second module receives the special packet, the second module sends feedback information to the first module. In some embodiments, the special packet may be generated by the first module. After generating the special packet, the first module sends the special packet to the second module. The special packet may be generated by another module. After generating the special packet, the another module sends the special packet to the first module, and/or the first node sends the special packet to the second module.

In some embodiments, a manner in which the detection module obtains the first quantity of data packets included in the first packet sent by the first module to the second module may be: The detection module receives second feedback information sent by the first module, where the second feedback information includes the first quantity of data packets included in the first packet. The second feedback information is generated by a detection submodule in the first module.

S402: The detection module obtains first feedback information sent by the second module.

The feedback information includes a second quantity of data packets included in the first packet received by the second module. In some embodiments, a detection submodule in the second module sends the first feedback information to the detection module, and the detection module receives the first feedback information. In some embodiments, the detection module may determine, based on the first feedback information, the second quantity of data packets included in the first packet received by the second module.

S403: The detection module calculates communication service availability of a network channel from the first module to the second module based on the first quantity and the second quantity.

In some embodiments, a manner in which the detection module calculates the CSA of the network channel from the first module to the second module based on the first quantity and the second quantity is: calculating a ratio of the second quantity to the first quantity; and determining the ratio as the CSA of the network channel from the first module to the second module. In a specific implementation process, the CSA of the network channel from the first module to the second module may be calculated in a preset time period. In another manner, the CSA of the network channel from the first module to the second module is calculated by using a preset time period as a periodicity.

For example, if the second quantity is 36, and the first quantity is 40, the detection module calculates that a quotient of the second quantity 36 and the first quantity 40 is 0.9, and determines 0.9 as the CSA of the network channel from the first module to the second module.

In some embodiments, the detection module determines, based on the communication service availability CSA between the first module and the second module, whether a fault occurs on the network channel from the first module to the second module. In some embodiments, a manner in which the detection module determines, based on the communication service availability CSA between the first module and the second module, whether the fault occurs on the network channel from the first module to the second module may be: If the CSA of the network channel from the first module to the second module is less than a first threshold, the detection module determines that the fault occurs on the network channel from the first module to the second module. The first threshold may be preset. For different network channels, the first threshold may have different values. For example, the network element includes a first module, a second module, and a third module. A first threshold of a network channel from the first module to the second module may be 0.8, and a first threshold of a network channel from the second module to the third module may be 0.9.

In some embodiments, after the detection module detects that the fault occurs on the network channel from the first module to the second module, the detection module may send an alarm. The alarm is used to prompt that the fault occurs on the network channel from the first module to the second module.

In a possible case, there may be a plurality of network channels from the first module to the second module. The detection apparatus may determine CSA of each of the plurality of network channels from the first module to the second module, and/or generate a key performance indicator (key performance indicator, KPI) report based on the CSA of each network channel. A user can directly obtain CSA information of each channel from the KPI report.

In another possible case, there may be a plurality of network channels from the first module to the second module. The detection module may determine CSA of each of the plurality of network channels from the first module to the second module, and/or select a target network channel from the plurality of network channels based on the CSA of each network channel, where the target network channel is used to transmit data from the first module to the second module.

In some embodiments, the following describes methods in which the detection module selects the target network channel from the plurality of network channels based on the CSA of each network channel.

According to a first method, the detection module determines the CSA of each of the plurality of network channels from the first module to the second module, and determines a network channel with highest CSA among the plurality of network channels as the target network channel. For example, in a network, optional network channels from the first module to the second module are a first network channel and a second network channel. If it is determined that CSA of the first network channel is 0.85, and CSA of the second network channel is 0.9, the detection module determines the second network channel as the target network channel. In some embodiments, the network channel with the highest CSA may be selected for data transmission in the network element, thereby improving reliability of the network element.

According to a second method, the detection module determines a latency of each of the plurality of network channels from the first module to the second module, calculates a capability score of each network channel based on a CSA calculation coefficient, a latency calculation coefficient, the CSA of each network channel, and the latency of each network channel, and determines a network channel with a highest capability score among the plurality of network channels as the target network channel. The CSA calculation coefficient and the latency calculation coefficient may be set by the user.

For example, if in the network element, the optional network channels from the first module to the second module are the first network channel and the second network channel, the CSA calculation coefficient is 20, and the latency calculation coefficient is −1, it is determined that the CSA of the first network channel is 0.85, and a latency is 5 milliseconds; and the CSA of the second network channel is 0.9, and a latency is 6 milliseconds. A capability score, of the first network channel, calculated based on the CSA calculation coefficient 20, the latency calculation coefficient −1, the CSA 0.85 of the first network channel, and the latency 5 of the first network channel is 12. A capability score, of the first network channel, calculated based on the CSA calculation coefficient 20, the latency calculation coefficient −1, the CSA 0.9 of the first network channel, and the latency 6 of the first network channel is 17. In this case, the detection module determines the second network channel as the target network channel. In some embodiments, a network channel suitable for data transmission may be selected from a plurality of optional network channels by comprehensively considering the CSA and the latency of the network channel.

In the method described in FIG. 4, the detection module may obtain the first quantity of data packets included in the first packet sent by the first module to the second module, and the second quantity of data packets included in the first packet received by the second module; and/or obtain the communication service availability CSA of the network channel from the first module to the second module through calculation based on the first quantity and the second quantity. In some embodiments, the communication service availability may be used as an indicator to evaluate the network reliability. In some embodiments, there is no need to manually detect a network channel between a single device and another network device in sequence, and reliability between modules in a network can be quickly and accurately detected and evaluated.

The foregoing describes the method embodiments of this application, and the following describes corresponding apparatus embodiments.

Figure 5:
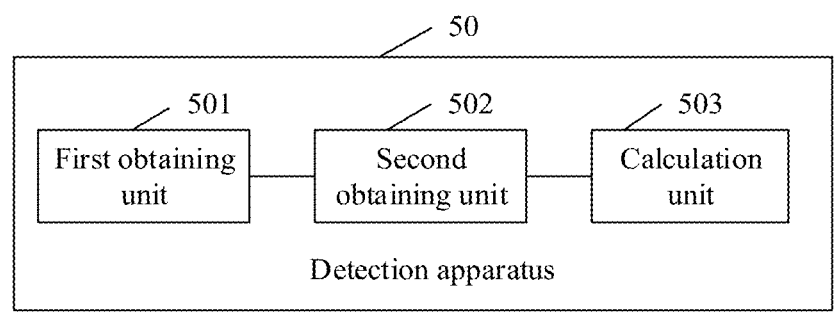
FIG. 5 is a schematic diagram of an example detection apparatus according to an embodiment of this application.

FIG. 5 is a schematic diagram of an example detection apparatus according to an embodiment of this application. The detection apparatus 50 includes a first obtaining unit 501, a second obtaining unit 502, and a calculation unit 503. The following describes the first obtaining unit 501, the second obtaining unit 502, and the calculation unit 503.

The first obtaining unit is configured to obtain a first quantity of data packets included in a first packet sent by a first network node to a second network node.

The second obtaining unit is configured to obtain first feedback information sent by the second network node, where the first feedback information includes a second quantity of data packets included in the first packet received by the second network node.

The calculation unit is configured to calculate communication service availability CSA of a network channel from the first network node to the second network node based on the first quantity and the second quantity.

In some embodiments, the first obtaining unit is configured to: send the first packet to the first network node; and receive second feedback information sent by the first network node, where the second feedback information includes the first quantity of data packets included in the first packet.

In some embodiments, the first obtaining unit is configured to: determine the first quantity; and send indication information to the first network node, where the indication information is used to indicate the first network node to send the first packet to the second network node, and the first packet includes the data packets of the first quantity.

In some embodiments, the first obtaining unit is configured to: send indication information to the first network node, where the indication information is used to indicate the first network node to send the first packet; and receive second feedback information sent by the first network node, where the second feedback information includes the first quantity of data packets included in the first packet.

In some embodiments, the first packet is a special packet sent by the first network node to the second network node. The first obtaining unit is configured to receive second feedback information sent by the first network node, where the second feedback information includes the first quantity of data packets included in the first packet.

In some embodiments, the calculation unit is configured to: calculate a ratio of the second quantity to the first quantity; and determine the ratio as the communication service availability of the network channel from the first network node to the second network node.

In some embodiments, the apparatus includes a determining unit. The determining unit is configured to determine, based on the communication service availability CSA of the network channel from the first network node to the second network node, whether a fault occurs on the network channel from the first network node to the second network node.

In some embodiments, there are a plurality of network channels from the first network node to the second network node, and the apparatus includes a selection unit. The selection unit is configured to: determine CSA of each of the plurality of network channels from the first network node to the second network node; and select a target network channel from the plurality of network channels based on the CSA of each network channel, where the target network channel is used to transmit data from the first network node to the second network node.

In some embodiments, for implementation of each operation in FIG. 5, refer to corresponding descriptions in the method embodiment shown in FIG. 3.

The detection apparatus shown in FIG. 5 may obtain the first quantity of data packets included in the first packet sent by the first network node to the second network node, and the second quantity of data packets included in the first packet received by the second network node; and/or obtain the communication service availability CSA of the network channel from the first network node to the second network node through calculation based on the first quantity and the second quantity. In some embodiments, the communication service availability may be used as an indicator to evaluate network reliability. In some embodiments, there is no need to manually detect a network channel between a single device and another network device in sequence, and reliability between network nodes in a network can be quickly and accurately detected and evaluated.

Figure 6:
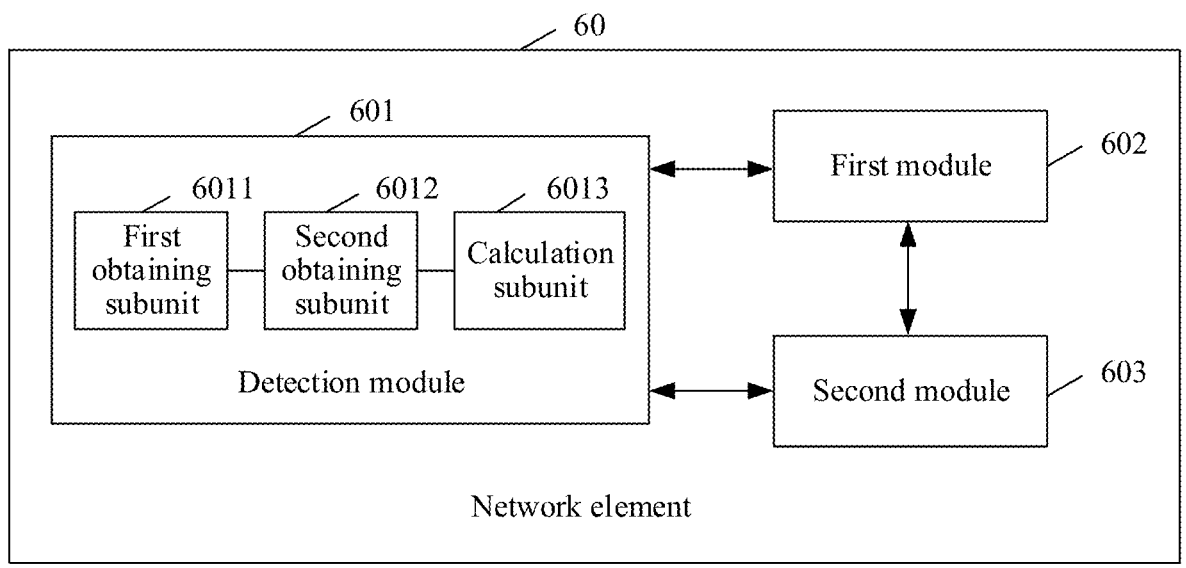
FIG. 6 is a schematic diagram of an example network element according to an embodiment of this application.

FIG. 6 is a schematic diagram of an example network element according to an embodiment of this application. The network element 60 includes at least a detection module 601, a first module 602, and a second module 603. The detection module includes a first obtaining submodule 6011, a second obtaining submodule 6012, and a calculation submodule 6013. The following describes the first obtaining submodule 6011, the second obtaining submodule 6012, and the calculation submodule 6013.

The first obtaining submodule 6011 is configured to obtain a first quantity of data packets included in a first packet sent by the first module 602 to the second module 603.

The second obtaining submodule 6012 is configured to obtain first feedback information sent by the second module 603, where the first feedback information includes a second quantity of data packets included in the first packet received by the second module 603.

The calculation submodule 6013 is configured to calculate communication service availability CSA of a network channel from the first module 602 to the second module 603 based on the first quantity and the second quantity.

In some embodiments, the first obtaining submodule is configured to: send the first packet to the first module; and receive second feedback information sent by the first module, where the second feedback information includes the first quantity of data packets included in the first packet.

In some embodiments, the first obtaining submodule is configured to: determine the first quantity; and send indication information to the first module, where the indication information is used to indicate the first module to send the first packet to the second module, and the first packet includes the data packets of the first quantity.

In some embodiments, the first obtaining subunit is configured to: send indication information to the first module, where the indication information is used to indicate the first module to send the first packet; and receive second feedback information sent by the first module, where the second feedback information includes the first quantity of data packets included in the first packet.

In some embodiments, the first packet is a special packet sent by the first module to the second module. The first obtaining subunit is configured to receive second feedback information sent by the first module, where the second feedback information includes the first quantity of data packets included in the first packet.

In some embodiments, the calculation submodule is configured to: calculate a ratio of the second quantity to the first quantity; and determine the ratio as the communication service availability of the network channel from the first module to the second module.

In some embodiments, the network element includes a determining module. The determining module is configured to: determine, based on the communication service availability CSA of the network channel from the first module to the second module, whether a fault occurs on the network channel from the first module to the second module.

In some embodiments, there are a plurality of network channels from the first module to the second module, and the network element includes a selection module. The selection module is configured to: determine CSA of each of the plurality of network channels from the first module to the second module; and select a target network channel from the plurality of network channels based on the CSA of each network channel, where the target network channel is used to transmit data from the first module to the second module.

In some embodiments, for implementation of each operation in FIG. 6, refer to corresponding descriptions in the method embodiment shown in FIG. 4.

In the network element shown in FIG. 6, the detection module may obtain the first quantity of data packets included the first packet sent by the first module to the second module, and the second quantity of data packets included in the first packet received by the second module; and/or obtain the communication service availability CSA of the network channel from the first module to the second module through calculation based on the first quantity and the second quantity. In some embodiments, the communication service availability may be used as an indicator to evaluate network reliability. In some embodiments, there is no need to manually detect a network channel between a single device and another network device in sequence, and reliability between modules in a network can be quickly and accurately detected and evaluated.

Figure 7:
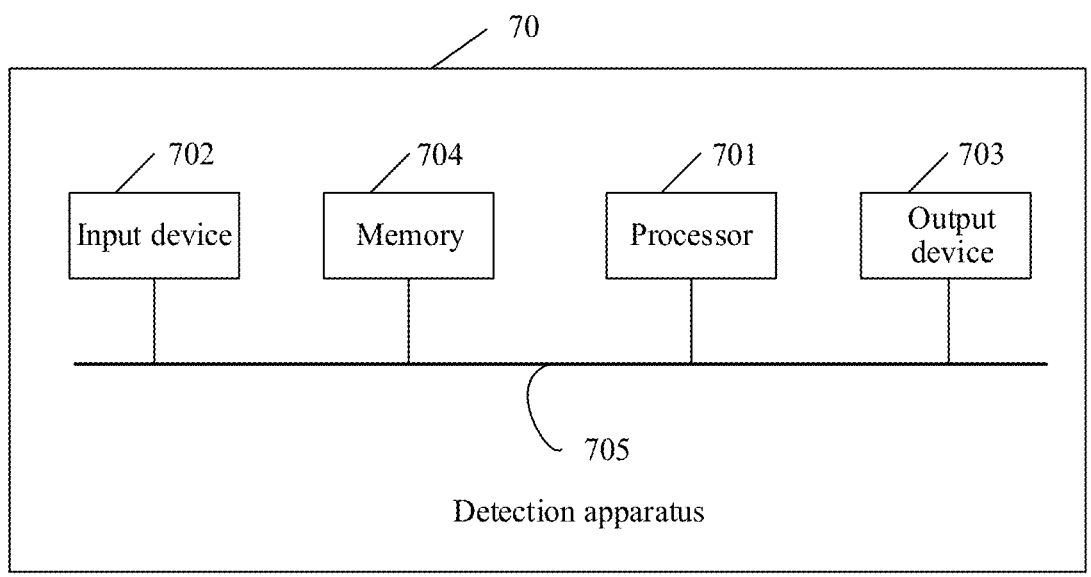
FIG. 7 is a schematic diagram of an example detection apparatus according to an embodiment of this application.

FIG. 7 is a schematic diagram of an example detection device according to an embodiment of this application. The first device 70 may include one or more processors 701, one or more input devices 702, one or more output devices 703, and a memory 704. The processor 701, the input device 702, the output device 703, and the memory 704 are connected by using a bus 705. The memory 704 is configured to store instructions.

The processor 701 may be a central processing unit, or the processor may be another general purpose processor, a digital signal processor, an application-specific integrated circuit, another programmable logic device, or the like. The general purpose processor may be a microprocessor, or the processor may be any conventional processor or the like.

The input device 702 may include a communications interface, a data line, and the like. The output device 703 may include a data line, a communications interface, and the like.

The memory 704 may include a read-only memory and a random access memory, and provide instructions and data to the processor 701. A part of the memory 704 may include a nonvolatile random access memory. For example, the memory 704 may store information of a device type.

The processor 701 is configured to run the instructions stored in the memory 704 to perform the following operations:

obtaining a first quantity of data packets included in a first packet sent by a first network node to a second network node;

obtaining first feedback information sent by the second network node, where the first feedback information includes a second quantity of data packets included in the first packet received by the second network node; and calculating communication service availability CSA of a network channel from the first network node to the second network node based on the first quantity and the second quantity.

In some embodiments, the processor 701 is configured to: send the first packet to the first network node; and receive second feedback information sent by the first network node, where the second feedback information includes the first quantity of data packets included in the first packet.

In some embodiments, the processor 701 is configured to: determine the first quantity; and send indication information to the first network node, where the indication information is used to indicate the first network node to send the first packet to the second network node, and the first packet includes the data packets of the first quantity.

In some embodiments, the processor 701 is configured to: send indication information to the first network node, where the indication information is used to indicate the first network node to send the first packet; and receive second feedback information sent by the first network node, where the second feedback information includes the first quantity of data packets included in the first packet.

In some embodiments, the first packet is a special packet sent by the first network node to the second network node. The processor 701 is configured to receive second feedback information sent by the first network node, where the second feedback information includes the first quantity of data packets included in the first packet.

In some embodiments, the processor 701 is configured to: calculate a ratio of the second quantity to the first quantity; and determine the ratio as the communication service availability of the network channel from the first network node to the second network node.

In some embodiments, the processor 701 is configured to determine, based on the communication service availability CSA of the network channel from the first network node to the second network node, whether a fault occurs on the network channel from the first network node to the second network node.

In some embodiments, there are a plurality of network channels from the first network node to the second network node, and the processor 701 is configured to: determine CSA of each of the plurality of network channels from the first network node to the second network node; and select a target network channel from the plurality of network channels based on the CSA of each network channel, where the target network channel is used to transmit data from the first network node to the second network node.

In some embodiments, for implementation of each operation in FIG. 7, refer to corresponding descriptions in the method embodiment shown in FIG. 3.

The detection apparatus shown in FIG. 7 may obtain the first quantity of data packets included in the first packet sent by the first network node to the second network node, and the second quantity of data packets included in the first packet received by the second network node; and/or obtain the communication service availability CSA of the network channel from the first network node to the second network node through calculation based on the first quantity and the second quantity. In some embodiments, the communication service availability may be used as an indicator to evaluate network reliability. In some embodiments, there is no need to manually detect a network channel between a single device and another network device in sequence, and reliability between network nodes in a network can be quickly and accurately detected and evaluated.

Figure 8:
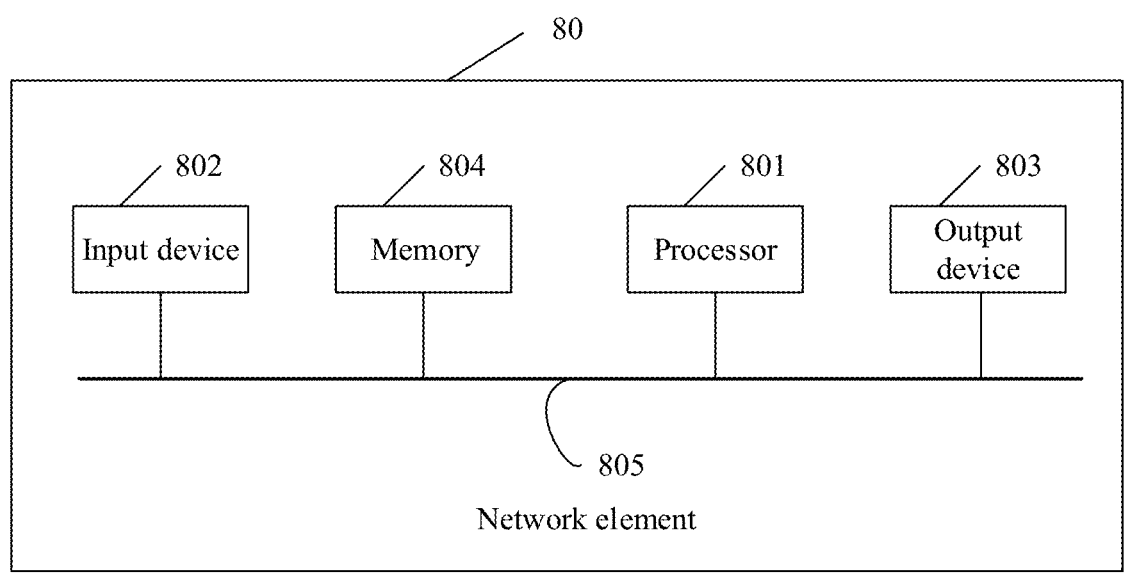
FIG. 8 is a schematic diagram of an example network element according to an embodiment of this application.

FIG. 8 is a schematic diagram of an example network element according to an embodiment of this application. The first device 80 may include one or more processors 801, one or more input devices 802, one or more output devices 803, and a memory 804. The processor 801, the input device 802, the output device 803, and the memory 804 are connected by using a bus 805. The memory 804 702 is configured to store instructions.

The processor 801 may be a central processing unit, or the processor may be another general purpose processor, a digital signal processor, an application-specific integrated circuit, another programmable logic device, or the like. The general purpose processor may be a microprocessor, or the processor may be any conventional processor or the like.

The input device 802 may include a communications interface, a data line, and the like. The output device 803 may include a data line, a communications interface, and the like.

The memory 804 may include a read-only memory and a random access memory, and provide instructions and data to the processor 801. A part of the memory 804 may include a nonvolatile random access memory. For example, the memory 804 may store information of a device type.

The processor 801 is configured to run the instructions stored in the memory 804 to perform the following operations:

obtaining a first quantity of data packets included in a first packet sent by a first module to a second module;

obtaining first feedback information sent by the second module, where the first feedback information includes a second quantity of data packets included in the first packet received by the second module; and calculating communication service availability CSA of a network channel from the first module to the second module based on the first quantity and the second quantity.

In some embodiments, the processor 801 is configured to: send the first packet to the first module; and receive second feedback information sent by the first module, where the second feedback information includes the first quantity of data packets included in the first packet.

In some embodiments, the processor 801 is configured to: determine the first quantity; and send indication information to the first module, where the indication information is used to indicate the first module to send the first packet to the second module, and the first packet includes the data packets of the first quantity.

In some embodiments, the processor 801 is configured to: send indication information to the first module, where the indication information is used to indicate the first module to send the first packet; and receive second feedback information sent by the first module, where the second feedback information includes the first quantity of data packets included in the first packet.

In some embodiments, the first packet is a special packet sent by the first module to the second module. The processor 801 is configured to receive second feedback information sent by the first module, where the second feedback information includes the first quantity of data packets included in the first packet.

In some embodiments, the processor 801 is configured to: calculate a ratio of the second quantity to the first quantity; and determine the ratio as the communication service availability of the network channel from the first module to the second module.

In some embodiments, the processor 801 is configured to: determine, based on the communication service availability CSA of the network channel from the first module to the second module, whether a fault occurs on the network channel from the first module to the second module.

In some embodiments, the processor 801 is configured to: determine CSA of each of a plurality of network channels from the first module to the second module; and select a target network channel from the plurality of network channels based on the CSA of each network channel, where the target network channel is used to transmit data from the first module to the second module.

In the network element shown in FIG. 8, the detection module may obtain the first quantity of data packets included the first packet sent by the first module to the second module, and the second quantity of data packets included in the first packet received by the second module; and/or obtain the communication service availability CSA of the network channel from the first module to the second module through calculation based on the first quantity and the second quantity. In some embodiments, the communication service availability may be used as an indicator to evaluate network reliability. In some embodiments, there is no need to manually detect a network channel between a single device and another network device in sequence, and reliability between modules in a network can be quickly and accurately detected and evaluated.

Another embodiment of this application provides a computer program product. When the computer program product runs on a computer, the method in the embodiment shown in FIG. 3 or FIG. 4 is implemented.

Another embodiment of this application provides a computer-readable storage medium. The computer-readable storage medium stores a computer program, and when the computer program is executed by a computer, the method in the embodiment shown in FIG. 3 or FIG. 4 is implemented.

The foregoing descriptions are merely specific implementations of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A method for detecting reliability of a network, comprising:

obtaining, by a detection apparatus, a first transmission on the network comprising an indication of a first quantity of data packets, the indication of the first quantity of data packets comprised in a first packet sent by a first network node to a second network node, wherein the first packet is a special packet sent by the first network node to the second network node on the network to cause the second network node to send an access request;

obtaining, by the detection apparatus, a second transmission on the network comprising first feedback information sent by the second network node, wherein the first feedback information comprises an indication of a second quantity of data packets, the indication of the second quantity of data packets comprised in the first packet received by the second network node;

calculating, by the detection apparatus, communication service availability (CSA) of each of a plurality of network channels from the first network node to the second network node based on the indication of the first quantity and the indication of the second quantity;

selecting, by the detection apparatus, a target network channel from the plurality of network channels based on the CSA of each network channel; and transmitting data from the first network node to the second network node using the target network channel.

2. The method according to claim 1, further comprising:
sending, by the detection apparatus, the first packet to the first network node; and
receiving, by the detection apparatus, second feedback information sent by the first network node, wherein the second feedback information comprises the indication of the first quantity of data packets comprised in the first packet.

3. The method according to claim 1, further comprising:
determining, by the detection apparatus, the indication of the first quantity; and
sending, by the detection apparatus, indication information to the first network node, wherein the indication information is used to indicate the first network node to send the first packet to the second network node, and the first packet comprises the data packets of the indication of the first quantity.

4. The method according to claim 1, further comprising:
sending, by the detection apparatus, indication information to the first network node, wherein the indication information is used to indicate the first network node to send the first packet; and
receiving, by the detection apparatus, second feedback information sent by the first network node, wherein the second feedback information comprises the indication of the first quantity of data packets comprised in the first packet.

5. The method according to claim 1, further comprising:
receiving, by the detection apparatus, second feedback information sent by the first network node, wherein the second feedback information comprises the indication of the first quantity of data packets comprised in the first packet.

6. The method according to claim 1, further comprising:
calculating, by the detection apparatus, a ratio of the second quantity to the first quantity; and
determining the ratio as the CSA of a network channel of the plurality of network channels from the first network node to the second network node.

7. The method according to claim 1, further comprising:
determining, by the detection apparatus based on the CSA of a network channel of the plurality of network channels from the first network node to the second network node, whether a fault occurs on the network channel from the first network node to the second network node.

8. A detection apparatus, comprising a processor to:
obtain a first transmission on a network comprising an indication of a first quantity of data packets, the indication of the first quantity of data packets comprised in a first packet sent by a first network node to a second network node, wherein the first packet is a special packet sent by the first network node to the second network node on the network to cause the second network node to send an access request;

obtain a second transmission on the network comprising first feedback information sent by the second network node, wherein the first feedback information comprises an indication of a second quantity of data packets, the indication of the second quantity of data packets comprised in the first packet received by the second network node;

calculate communication service availability (CSA) of each of a plurality of network channels from the first network node to the second network node based on the indication of the first quantity and the indication of the second quantity;

select a target network channel from the plurality of network channels based on the CSA of each network channel; and transmit data from the first network node to the second network node using the target network channel.

9. The apparatus according to claim 8, wherein the processor further to:
send the first packet to the first network node; and
receive second feedback information sent by the first network node, wherein the second feedback information comprises the indication of the first quantity of data packets comprised in the first packet.

10. The apparatus according to claim 8, wherein the processor further to:
determine the indication of the first quantity; and
send indication information to the first network node, wherein the indication information is used to indicate the first network node to send the first packet to the second network node, and the first packet comprises the data packets of the indication of the first quantity.

11. The apparatus according to claim 8, wherein the processor further to:
send indication information to the first network node, wherein the indication information is used to indicate the first network node to send the first packet; and
receive second feedback information sent by the first network node, wherein the second feedback information comprises the indication of the first quantity of data packets comprised in the first packet.

12. The apparatus according to claim 8, wherein the processor further to:
receive second feedback information sent by the first network node, wherein the second feedback information comprises the indication of the first quantity of data packets comprised in the first packet.

13. The apparatus according to claim 8, wherein the processor further to:
calculate a ratio of the second quantity to the first quantity; and
determine the ratio as the CSA of a network channel of the plurality of network channels from the first network node to the second network node.

14. The apparatus according to claim 8, wherein the processor further to:
determine, based on the CSA of a network channel of the plurality of network channels from the first network node to the second network node, whether a fault occurs on the network channel from the first network node to the second network node.

15. A network element, comprising a processor to:
obtain a first transmission on a network comprising an indication of a first quantity of data packets, the indication of the first quantity of data packets comprised in a first packet sent by a first module to a second module, wherein the first packet is a special packet sent by the first module to the second module to cause the second module to send an access request;

obtain a second transmission on the network comprising first feedback information sent by the second module, wherein the first feedback information comprises an indication of a second quantity of data packets, the indication of the second quantity of data packets comprised in the first packet received by the second module; and calculate communication service availability (CSA) of each of a plurality of network channels from the first module to the second module based on the indication of the first quantity and the indication of the second quantity;

select a target network channel from the plurality of network channels based on the CSA of each network channel; and configure the target network channel to transmit data from the first module to the second module.

16. The network element according to claim 15, wherein the processor further to:

send the first packet to the first module; and receive second feedback information sent by the first module, wherein the second feedback information comprises the indication of the first quantity of data packets comprised in the first packet.

17. The network element according to claim 15, wherein the processor further to:

determine the indication of the first quantity; and send indication information to the first module, wherein the indication information is used to indicate the first module to send the first packet to the second module, and the first packet comprises the data packets of the indication of the first quantity.

18. The network element according to claim 15, wherein the processor further to:

send indication information to the first module, wherein the indication information is used to indicate the first module to send the first packet; and receive second feedback information sent by the first module, wherein the second feedback information comprises the indication of the first quantity of data packets comprised in the first packet.

* * * * *